June 25, 1940. J. F. PFEIFFER Re. 21,493

TYPEWRITING MACHINE

Original Filed Nov. 16, 1934 4 Sheets-Sheet 1

INVENTOR
JACOB FRITZ PFEIFFER
By
Bonnelycke, Young, Emery & Thompson
ATTYS.

June 25, 1940. J. F. PFEIFFER Re. 21,493

TYPEWRITING MACHINE

Original Filed Nov. 16, 1934 4 Sheets-Sheet 2

Inventor:
Jacob F. Pfeiffer By Emil Bönndjer
Attorney

June 25, 1940. J. F. PFEIFFER Re. 21,493

TYPEWRITING MACHINE

Original Filed Nov. 16, 1934 4 Sheets-Sheet 3

Inventor
Jacob F. Pfeiffer
By Emil Bönnelycke
Attorney

June 25, 1940. J. F. PFEIFFER Re. 21,493
TYPEWRITING MACHINE
Original Filed Nov. 16, 1934 4 Sheets-Sheet 4
Fig. 12
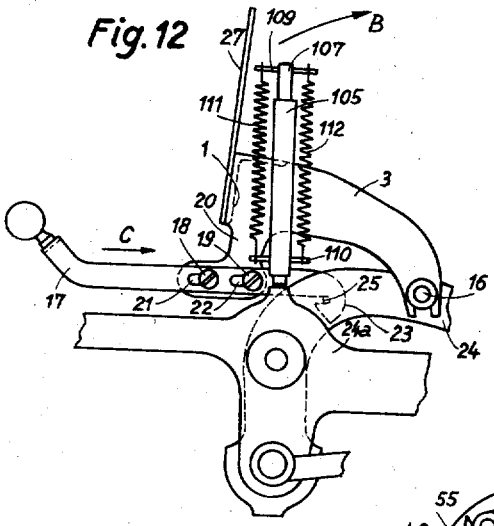
Fig. 13
Fig. 14
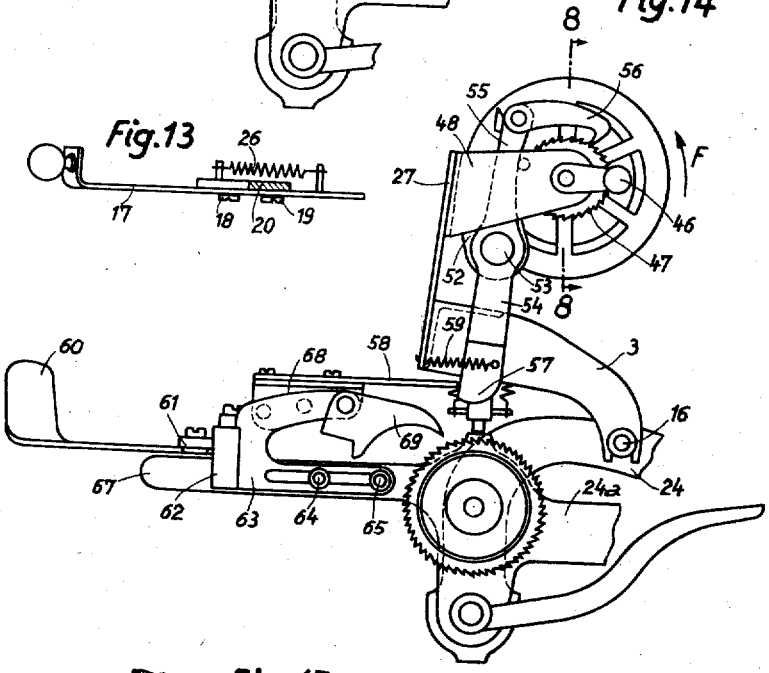
Fig. 15
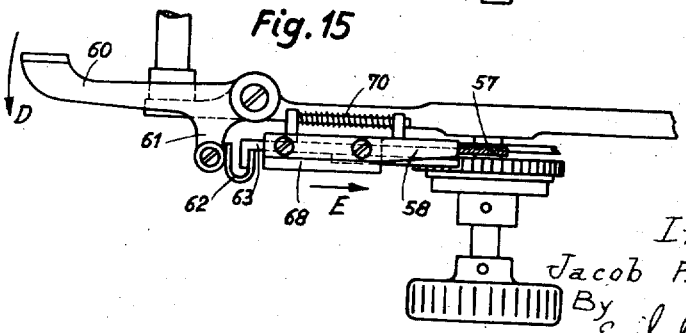
Inventor:
Jacob F. Pfeiffer
By Emil Bönnelycke
Attorney Reissued June 25, 1940

Re. 21,493

UNITED STATES PATENT OFFICE 21,493

TYPEWRITING MACHINE

Jacob Fritz Pfeiffer, Zurich, Switzerland, assignor to Wanderer-Werke vorm. Winklhofer & Jaenicke Akt.-Ges., Schonau, near Chemnitz, Germany Original No. 2,139,095, dated December 6, 1938, Serial No. 753,381, November 16, 1934. Application for reissue December 8, 1939, Serial No. 308,300. In Germany November 18, 1933

10 Claims. (Cl. 197—153)

This invention relates to a device on commercial writing machines for simultaneously writing on foundation and front sheets guided independently of one another.

In known devices of this class the entries produced by writing on the front sheet were transmitted to the foundation sheet by means of sheet of carbon paper, the foundation sheet being either completely covered by the interposed sheet of carbon paper or, if the sheet of carbon paper was placed underneath it, chosen from transparent material, in which latter case the entries were made on the back of the foundation sheet in reversed writing and had to be read through it. In other known devices simultaneously writing on several superposed sheets was effected by means of one or several supplementary inked ribbons. These devices are, however, open to the objection that the various sheets must be fed by hand to the machine and, in quite a bothersome way, placed in proper position relative to the ribbons which, moreover, have to be moved by special manipulations.

The invention proposes to eliminate the drawbacks of the known devices and to provide a device permitting rapid insertion of the various sheets in writing position and instantaneous writing immediately after the introduction of the front sheets.

According to the invention, this object is attained by arranging on the carriage of the machine means provided with guides for feeding the front sheet in front of the foundation sheet already disposed in the machine and, further, a supplementary ribbon appliance with a ribbon movable in its longitudinal direction and extending over the line to be written, the supplementary ribbon appliance being in connection with the guides for the front sheet in such a way that the supplementary ribbon is always positioned between the foundation sheet and the front sheet brought by the guides on a level with the line and placed against the foundation sheet.

Figure 1:
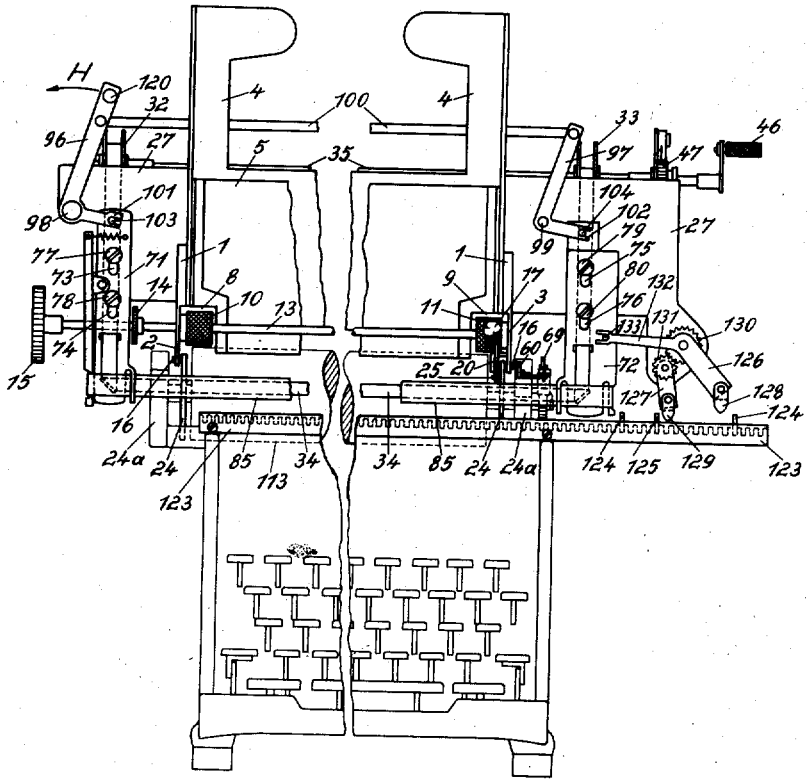
Figure 2:
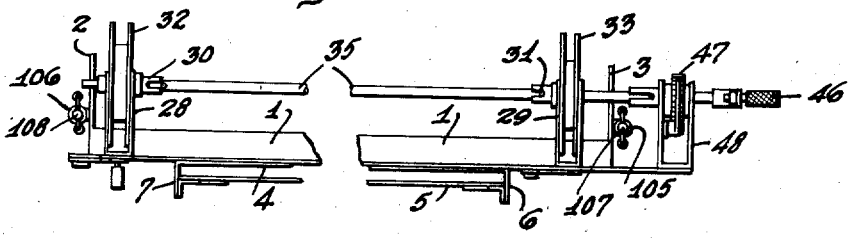
Figure 3:
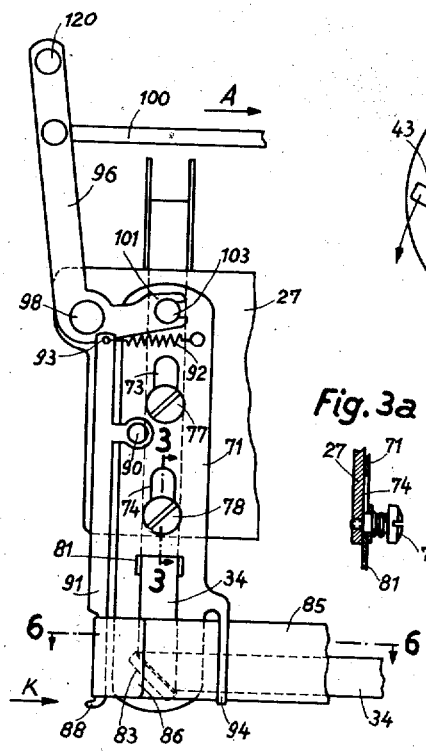
Figure 3A:
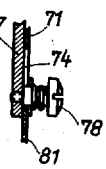
Figure 4:
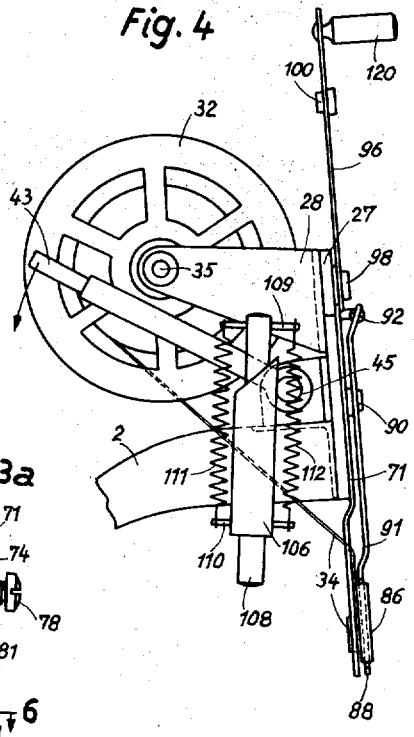
Figure 6:
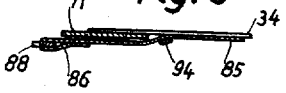
Figure 5:
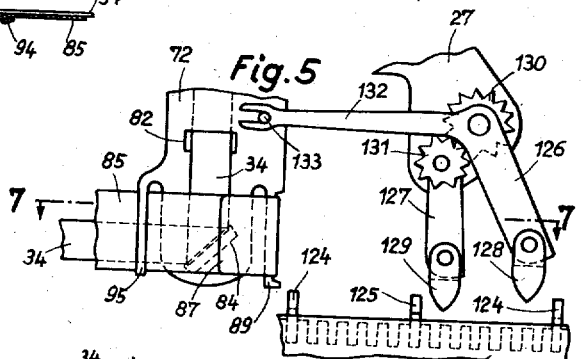
Figure 7:
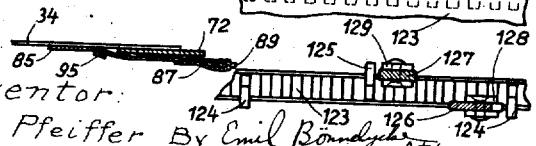
Figure 8:
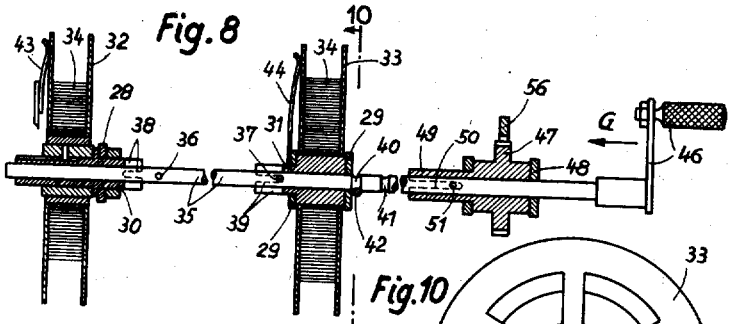
Figure 10:
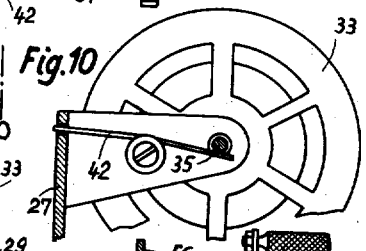
Figure 9:
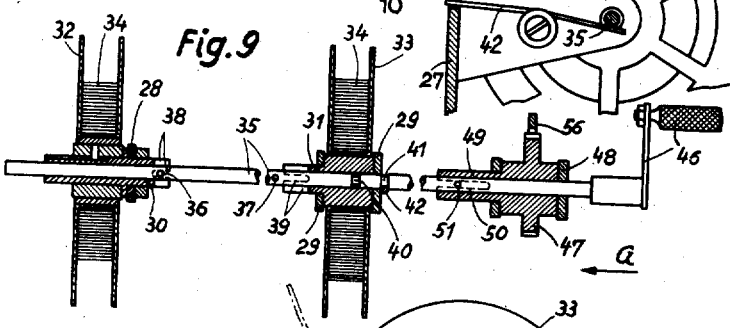
Figure 11:
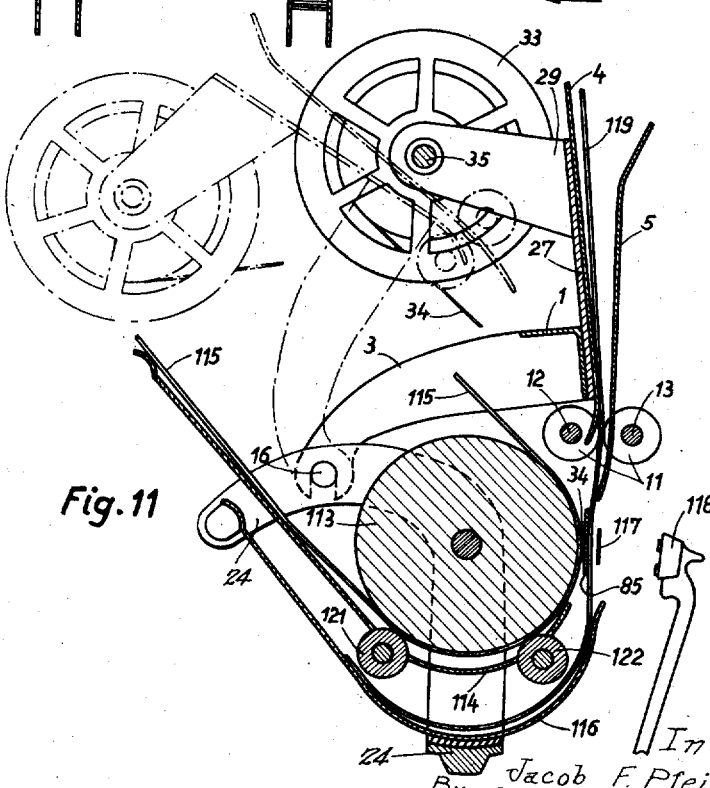

By way of example, one form of the invention is illustrated in the accompanying drawings, in which:

Figure 1 is a front view of the device;

Fig. 2, a top view thereof;

Fig. 3, a partial front view of the device on an enlarged scale;

Fig. 3*a*, a section on the line 3—3, of Fig. 3;

Fig. 4, a side view of Fig. 3 in the direction of the arrow A;

Fig. 5, a detail view of Fig. 1 on the scale of Fig. 3;

Fig. 6, a section on the line 6—6, of Fig. 3;

Fig. 7, a section on the line 7—7, of Fig. 5;

Fig. 8, a detail view in section on line 8—8, of Fig. 14;

Fig. 9, a section corresponding to that shown in Fig. 8 with the parts in changed position;

Fig. 10, a section on the line 10—10, of Fig. 8;

Fig. 11, a cross section of the device and part of the carriage;

Fig. 12, a side view of the fastening means for the device;

Fig. 13, a top view of a detail of the means shown in Fig. 12;

Fig. 14, a side view of the device with the line spacing mechanism; and

Fig. 15, a top view of Fig. 14.

The drawings show the invention applied to a typewriter with all the parts of the latter omitted, which are not necessary to understand the invention.

Referring to the drawings, 1 is an angle iron carrier, as indicated in Figs. 2 and 11, with the arms 2 and 3 firmly secured to its ends. The carrier 1 is provided with front sheet guides comprising the rear and front walls 4 and 5 and the side walls 6 and 7, as shown in Fig. 2. The front wall 5 and the rear wall 4 possess in their lower part the recesses 8 and 9 into which the two pairs of feed rollers 10 and 11 project pressed together by spring power and firmly arranged on the two shafts 12 and 13, Fig. 11, which, by means of movable arms, not shown, are disposed on the carrier 1 and are in driving connection with one another by means of the pair of toothed wheels 14, Fig. 1. For turning the feed rollers 10, 11 one of the two shafts 12, 13 is extended and fitted with a hand wheel 15, Fig. 1. Instead of the hand wheel 15, a control member provided with a selecting mechanism may be used for driving the feed rollers 10, 11, whereby feeding of the front sheets up to a certain line that can be quickly selected at will becomes possible as disclosed in applicant's Patent No. 2,086,945, issued July 13, 1937.

The attachment of the device is effected by means of the pins 16, as shown in Figs. 1, 12 and 14, which are disposed on the case shift frame 24 of the carriage 24, 24*a* and engage the arms 2 and 3 and about which the carrier 1 and the device secured thereto can be moved in the direction of the arrow B in Fig. 12. The device is fastened in operative position by manually actuated means shown in Figs. 12 and 13, which comprise in the main a slide 17 displaceably disposed on the holder 20 of the carrier 1 in the slots 21 and 22 by means of the screws 18 and 19. One end of the slide 17 forms the hook 23 and, in the position shown in Fig. 12, embraces a stud 25 secured to the carriage portion 24. A tension spring 26, Fig. 13 engaging with one end of the slide 17 and with the other the holder 20 tends to displace the slide 17 towards the left, as indicated in Fig. 12, and to press the hook-shaped end 23 thereof against the stud 25.

By a displacement of the slide 17 against the action of the spring 26 in the direction of the arrow C in Fig. 12 the hook 23 can be brought out of engagement with the stud 25 so as to permit turning the carrier 1 with the entire device about the pins or pivots 16 in the direction of the arrow B in Fig. 12.

To the rear wall 4 of the front feeding device a carrying plate 27 is secured, as indicated in Figs. 1 and 2, which is provided with means for carrying and moving the supplementary ribbon. On the rear side of the carrying plate 27 and vertically extending thereto the supports 28 and 29 are arranged, as shown in Figs. 2, 8 and 9, in which the bosses 30, 31 of the spools 32, 33 for the supplementary ribbon 34 are rotatably positioned. The bosses 30, 31 are penetrated by an axially displaceable shaft 35 fitted with two catch pins 36, 37 which fit into the slots 38, 39 in the bosses 30, 31 and can be selectively brought into engagement therewith by axial displacement of the shaft 35, in which they are, however, disposed so that only one of them can engage the slots of the respective boss. The engaged pin connects the shaft 35 with the boss concerned, and the other boss can freely rotate on the shaft 35. A snap spring 42 cooperating with two grooves 40, 41 in the shaft 35 holds the latter in position.

Two spring brakes 43, 44, as shown in Figs. 4 and 8, of which the brake 43 can be moved about the pivot 45, (Fig. 4) serve for preventing too easy running of the spools 32, 33 and thus the loosening of the supplementary ribbon. A crank 46 firmly disposed at one end of the shaft 35 serves for turning and axially displacing the shaft.

The rear side of the carrying plate 27 is further provided with means for automatically moving the supplementary ribbon 34. These means substantially comprise a ratchet wheel 47 rotatably disposed in a carrier 48 and secured against axial displacement. The boss 49 of the wheel 47 has a slot 50 which is engaged by a pin 51 arranged in the shaft 35 to insure constant rotary connection between the shaft 35 and the wheel 47 notwithstanding the axial mobility of the shaft.

On a pivot 53 secured in a flap 52, Fig. 14, of the carrier 48 a two-armed lever 54 is arranged on whose arm 55 a pawl 56 cooperating with the ratchet wheel 47 is rotatably disposed. The other lever arm 57 contacts with a butt plate 58, as shown in Figs. 14 and 15, and a tension spring 59 secured with one end to the carrying plate 27 and with the other end to the arm 57 tends continually to press the arm 57 against the plate 58.

60 designates the usual line spacing lever of the typewriter, which, on being actuated, acts by means of the arm 61 and the cushioning laminated spring 62 on a slide 63 which, by means of the pins 64, 65 and the slot 66, is displaceably disposed on the arm 67 of the carriage 24, 24a. The slide 63 is fitted with a bracket 68 to which the usual line spacing pawl 69 and the butt plate 58 are secured. A compression spring 70 supported by the arm 67 of the carriage and the slide 63 tends to return the line spacing lever 60 after operation to its initial position.

The front side of the carrying plate 27 is provided with a guiding device for the supplementary ribbon 34, as indicated in Figs. 1 and 3 to 7, which consists chiefly of the two ribbon carriers 71, 72 adjustably secured to the carrying plate 27 by means of the screws 77, 78, 79 and 80 disposed in the slots 73, 74, 75 and 76. The ribbon 34 unwinding for example from the spool 33 passes through the slot 81 to the front side of the left carrier 71, as shown in Figs. 1 and 3, and, by means of the obliquely arranged guide slot 83, is reversed 90° and thus guided in the length of the line parallel to the platen. An oblique slot 84 in the right-hand ribbon carrier 72, Fig. 5, corresponds to the slot 83 and deflects the ribbon 34 from its horizontal back to vertical direction, whereupon it is guided through the slot 82 to the receiving spool 32.

On the front side, the supplementary ribbon 34 is covered over the entire line by a protective band 85 relative to the front sheet. The protective band 85 consists of a thin material possessing great tensile strength and being preferably transparent like Celluloid or similar substances, and is provided at its ends with the loops 86, 87 shown in Figs. 6 and 7 for attachment to the hooks 88, 89, one of which is disposed at one end of a double-armed lever 91 movable about a pivot 90. A tension spring 92 secured to the other end of the lever 91 and to the ribbon carrier 71 tends to keep the protective band 85 tensioned which is held in position directly in front of the supplementary ribbon 34 by the guide hooks 94, 95 arranged on the ribbon carriers 71, 72.

96, 97 designate two elbow levers disposed on the pivots 98, 99 on the carrying plate 27. Two sides of these levers 96, 97 are connected by a rod 100, and the other sides by the forks 101, 102 and the pins 103, 104 are united with the ribbon carriers 71, 72.

On both sides of the carrier arms 2, 3 means for balancing the weight of the entire device are provided, as indicated in Figs. 2, 4 and 12. For this purpose, the arms 2, 3 have secured to them the sleeves 105, 106 wherein the supports 107, 108 are displaceably arranged, and the sleeves as well as the supports are provided with the spring carriers 109, 110 engaged by the tension springs 111, 112. When the device is in operative position, the supports 107, 108 rest on the carriage frame 24a and the springs 111, 112 are tensioned and tend to lift the platen 113, Fig. 11, together with the device from the non-shiftable part 24a of the carriage, so that the weight of the device has no disturbing effect during the shifting of the part 24 of the carriage, which carries the platen 113 and the device.

Referring particularly to Fig. 12, the shiftable part 24 carried by the platen 113 is supported by the supports 107, 108 influenced by the springs 111, 112 on the non-shiftable part 24a of the paper carriage and as a matter of fact by means of the slide 17 on the parts 1, 2, 3. The slide 17 has a hook 23 which grips the stud 25 which is secured on the shiftable part 24. The springs 111, 112 tend to lift the parts 1, 2, 3 and the slide 17 secured thereto and also the carriage portion 24 above the hook 23 and stud 25 relative to the rigid paper carriage part 24a.

Below the platen 113 the usual plate 114 for guiding the foundation sheet 115 to be inserted from the rear around the platen 113 is provided. Below the guide 114 and the feed rolls 121, 122 for the foundation sheet, which pass through the guide 114, a second guide 116 for the front sheet 119 introduced from the front side of the machine is arranged, it being possible of course simultaneously to insert a plurality of foundation and front sheets. Correspondingly, the number of supplementary ribbons can be increased, and the device is shown and described in connection with only one foundation and front sheet and only one supplementary ribbon merely for the sake of clearness. Fig. 11 shows the regular ribbon 117 of the typewriter and a type bar 118 in front thereof. The device functions as follows:

By displacing the slide 17, Fig. 12, in the direction of the arrow C the fastening device is released in the manner described, whereupon the carrier 1 together with the entire device is moved about the pivots 16 in the direction of the arrow B, Fig. 12, into the chain-dotted position in Fig. 11. In this position, the foundation sheet 115 is introduced into the machine from the rear over the guide 114 and around the platen 113. The device is then turned down and brought into operative position in which it is secured by the fastening means 17 to 25. The front feed sheet 119 is inserted from above in the funnel formed by the guides 4 to 7 and by turning the feed rolls 10, 11 by means of the hand wheel 15 or another control member advanced until a certain line is in register with the line of the foundation sheet 115. The guides 4, 5 are preferably bent towards the platen 113, and the supplementary ribbon 34 is arranged underneath the guides 4, 5 in such a way that the descending front sheet 119 enters the space between the supplementary ribbon 34 and the regular ribbon 117, the supplementary ribbon 34 being thus safely positioned on a level with the line between the foundation sheet 115 and the front sheet 119 placed by the guides 4, 5 and the feed rolls 10, 11 against the foundation sheet 115. In this way, manual insertion of the supplementary ribbon 34 between the likewise manually separated foundation and front sheeets 115, 119 is eliminated.

The insertion of the foundation sheet 115 not covered by a sheet of carbon paper and the feeding of the front sheet 119 are effected in an extraordinarily simple and rapid manner.

When the line space lever 60 is operated in the direction of the arrow D, Fig. 15, the butt plate 58 moves in the direction of the arrow E, engages the arm 57 and turns the lever 54 whereby the ratchet wheel 47 and the shaft 35 firmly connected therewith are moved a certain distance in the direction of the arrow F by the pawl 56. If, as shown in Fig. 8, the catch pin 37 is in engagement with the adjacent boss 31, the rotation of the shaft 35 will cause the spool 33 to move also and to wind up the supplementary ribbon 34, whereas the spool 32 is turned in opposite direction by the ribbon 34 unwinding therefrom.

The above-described intermediate members 47 to 58 bring it about that the operation of the line space lever 60 causes the supplementary ribbon 34 to be moved in its longitudinal direction. The ribbon 34 can be moved also by turning the crank 46.

When the ribbon 34 has been completely wound up on the spool 33, axial displacement of the shaft 35 in the direction of the arrow G, Figs. 8 and 9, will cause the catch pin 36 to engage the boss 30 and, simultaneously, bring the pin 37 out of engagement with the boss 31, so that at the rotation of the crank 46 or ratchet wheel 47 the spool 32 will move in winding up direction and the spool 33 turn loosely.

Motion of the lever 91 in the direction of the arrow K, Fig. 3, will release the tension of the protective band 85 which can then be easily removed from the hooks 88, 89 and exchanged. The protective band 85 prevents writing on the back of the front feed sheet 119.

When not in use, the entire device, after release of the fastening means 17 to 25 and of a simple locking mechanism, such as the button 16a (Figs. 12 and 14), which is attached to one of the pivots 16, can be easily lifted off from the machine and returned thereto.

In the position shown in Fig. 1 the supplementary ribbon 34 is in writing position in front of the platen 113. When the bell crank 96 is moved in the direction of the arrow H, Fig. 1, by means of the knob 120, the ribbon carriers 71, 72 and thus the ribbon strip on the level of the line will be raised and brought out of range of the line, so that the adjusted type line of the foundation sheet 115 will become visible. At this adjustment of the supplementary ribbon 34 entries can be made on the front feed sheet 119 without causing them to appear on the foundation sheet 115.

By means of an additional device, this adjustment of the supplementary ribbon 34, i. e., the raising and lowering of the ribbon carriers 71, 72 can be made automatic in dependence upon the working motion of the carriage passing from the right to the left, as indicated in Fig. 1. For this purpose, the fixed machine frame carries for instance a bar or track 123, as shown in Fig. 1, which approximately corresponds in length to the width of the sheet and, at various places, is provided with the attachable adjusting stops 124, 125. During the working motion of the carriage the stops 124, 125 act on the two levers 126, 127 rotatably disposed on the carrying plate 27 of the frame 1, 2, 3 which when the carriage moves strike with their movable end pieces 128, 129 against the corresponding stops 124, 125. The levers 126, 127 with their end pieces 128, 129 and the adjusting stops 124, 125 are staggered relative to one another in the direction of motion of the carriage, i. e., in the longitudinal direction of the track 123, so that the end piece 128 of the lever 126 cooperates only with the stop 124 and the end piece 129 of the lever 127 exclusively with the stop 125. The adjusting stops 124, 125 attached to the bar 123 are preferably constructed so that they can cooperate also with the other end piece 129 or 128 simply by being turned over and re-attached, and they can then have the same form, differing merely in the manner of attachment to the bar 123. The end pieces 128, 129 are constructed and arranged on the levers 126, 127 in such a way that during the return of the carriage from the left to the right, Fig. 1, they will pass lightly over the adjusting stops 124, 125 without causing any motion of the levers 126, 127. Only the working travel of the carriage from the right to the left, as indicated in Fig. 1, will bring about a motion of the levers 126, 127, owing to the contact between their end pieces, 128, 129 and the adjusting stops 124, 125, in which case both levers will be turned anticlockwise. By means of the toothed wheels 130, 131 firmly connected with them, both levers 126, 127 are linked so that if one lever is actuated the other will be moved also, though in opposite direction.

The lever 126 possesses a free arm 132 whose forked end engages a pin 133 of the ribbon carrier 72. When, therefore, the end piece 129 strikes the stop 125 and the lever 127 is moved anti-clockwise, the lever 126, owing to the toothed wheel connection 131, 130, will be turned clockwise and the ribbon carrier 72 together with the ribbon carrier 71 connected therewith and the supplementary ribbon 34 will be lifted from writing into inoperative position. Simultaneously, the end piece 128 of the lever 126 will be moved into the path of the corresponding adjusting stop 124 and, during further motion of the carriage in working direction, strike against the stop 124, so that the lever 126 will be turned anti-clockwise and the ribbon 34 lowered into writing position.

By means of the attachable adjusting stops 124, 125 automatic engagement and disengagement of the ribbon 34 can be effected at predetermined points of the carriage motion so as to make entries only in certain columns of the front feed sheet 119, whereas in other columns both sheets are simultaneously written on without requiring any manipulation on the part of the writer.

I claim:

1. A commercial writing machine, including a platen carriage, means for feeding and holding inner work sheets around the platen of the machine, a detachable paper carrier comprising guides and feed rollers for inserting and feeding front sheets in front and independently of the inner sheets and a frame mounted on the platen carriage, a main ribbon, at least one supplementary ribbon, ribbon carriers for said supplementary ribbon, said guides and feed rollers and ribbon carriers being arranged on said frame to guide and feed the front sheets between the main and supplementary ribbons by rotating said feed rollers, and means forming a part of the paper carrier for supporting said frame on said platen carriage.

2. A commercial writing machine according to claim 1, in which said guides and feed rollers and said ribbon carriers are arranged to provide for said front sheets a path of travel extending between the main and the supplementary ribbons and through the writing position along which path said front sheets are moved by rotation of said rollers.

3. A commercial writing machine according to claim 1, in which means are included for moving the supplementary ribbon into and out of operative position by means of the carriage in dependence on the letter feed position of the latter.

4. A commercial writing machine according to claim 1, in which means are included comprising stops settable in any desired position along the transverse path of the carriage for moving the supplementary ribbon into and out of operative position.

5. A commercial writing machine according to claim 1, in which a fixed bar extending parallel to the transverse path of the carriage and having a series of stop-retaining means, and stops, are provided, settable in any of said retaining means said stops cooperating with the traverse of the carriage to move the supplementary ribbon into and out of operative positions at predetermined points in the traverse of said carriage.

6. A commercial writing machine according to claim 1, in which a fixed bar extending parallel to the transverse path of the carriage and having a series of stop-retaining means, stops settable in any of said retaining means, and two abutment members, are provided, cooperating with said stops during the traverse of the carriage, one of which members controls movement of the supplementary ribbon into operative position at the level of the typing line and the other of which members controls movement of the said ribbon out of the typing line.

7. A commercial writing machine according to claim 1, in which a fixed bar extending parallel to the transverse path of the carriage and having a series of stop-retaining means, stops settable in any of said retaining means, and two abutment members, are provided, cooperating with said stops during the traverse of the carriage, one of which members controls movement of the supplementary ribbon into operative position at the level of the typing line and the other of which members controls movement of the said ribbon out of the typing line, the abutment members and the parts of the settable stops being arranged in relatively opposite position in the direction of traverse of the carriage.

8. A commercial writing machine according to claim 1, in which said last-mentioned means comprises a pair of pins arranged coaxially to each other.

9. A commercial writing machine according to claim 1, in which said last-mentioned means comprises a pair of pins arranged coaxially to each other and a button provided at one of said pins for securing the frame upon the pin.

10. A commercial writing machine according to claim 1, in which said last-mentioned means comprises a pair of pins arranged coaxially to the platen.

JACOB FRITZ PFEIFFER.